(12) United States Patent
Goodart et al.

(10) Patent No.: US 7,830,650 B2
(45) Date of Patent: Nov. 9, 2010

(54) EXTERNALLY CONNECTABLE THIN DISPLAY

(75) Inventors: Joe E. Goodart, Austin, TX (US); Pratik Mehta, Austin, TX (US); Bruce Montag, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 167 days.

(21) Appl. No.: 12/179,257

(22) Filed: Jul. 24, 2008

(65) Prior Publication Data

US 2010/0020482 A1 Jan. 28, 2010

(51) Int. Cl.
*G06F 1/16* (2006.01)
(52) U.S. Cl. .................................... 361/679.21
(58) Field of Classification Search ............ 361/679.21; 349/58
See application file for complete search history.

(56) References Cited

U.S. PATENT DOCUMENTS

| | | | |
|---|---|---|---|
| 5,668,570 A | | 9/1997 | Ditzik |
| 5,786,984 A | * | 7/1998 | Bonardi et al. ......... 361/679.33 |
| 5,793,606 A | * | 8/1998 | Cubbage et al. ........ 361/679.29 |
| 5,835,343 A | * | 11/1998 | Johns et al. ............ 361/679.27 |
| 6,052,279 A | * | 4/2000 | Friend et al. ........... 361/679.32 |
| 6,104,451 A | * | 8/2000 | Matsuoka et al. ............. 349/58 |
| 6,366,452 B1 | | 4/2002 | Wang et al. |
| 6,392,873 B1 | | 5/2002 | Honda |
| 6,556,431 B1 | * | 4/2003 | Ozias et al. ............ 361/679.41 |
| 6,636,282 B2 | * | 10/2003 | Ogawa et al. ................. 349/58 |
| 7,072,179 B1 | * | 7/2006 | Curran et al. .......... 361/679.21 |
| 2004/0150945 A1 | * | 8/2004 | Mache et al. ................ 361/683 |
| 2006/0022108 A1 | | 2/2006 | Kuga |
| 2006/0198097 A1 | * | 9/2006 | Kuwajima et al. .......... 361/685 |
| 2006/0203436 A1 | * | 9/2006 | Hwang et al. ................ 361/679 |
| 2006/0221565 A1 | * | 10/2006 | Doherty et al. ............. 361/683 |
| 2007/0064388 A1 | * | 3/2007 | Uchizono et al. ........... 361/690 |
| 2008/0186664 A1 | * | 8/2008 | Chang et al. ................ 361/681 |

* cited by examiner

*Primary Examiner*—Lisa Lea-Edmonds
(74) *Attorney, Agent, or Firm*—Haynes and Boone, LLP (57) ABSTRACT

A display system includes a display chassis defining a display chassis housing. A display panel is located in the display chassis housing. A power supply module chassis defines a power supply module housing and is coupled to the display chassis outside of the display chassis housing. A power supply module is located in the power supply module housing and coupled to the display panel. Such display system architecture allows the display chassis to be much thinner than conventional externally connectable display chassis.

20 Claims, 10 Drawing Sheets

EXTERNALLY CONNECTABLE THIN DISPLAY

BACKGROUND

The present disclosure relates generally to information handling systems, and more particularly to an externally connectable, thin display for an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs such as, for example, desktop IHSs, typically include a display for displaying information from the IHS. It is desirable for the display of the IHS to be as thin as possible for aesthetic reasons, so that the display will take up less space, and in order to decrease shipping costs related to weight. Conventional thin displays such as, for example, liquid crystal displays (LCDs), incorporate the display electronics in the display chassis behind the display panel. Those display electronics may include a power supply module that includes an inverter for driving the cold cathode fluorescent lighting (CCFL) backlights, a display controller card that typically includes a scalar chip, an analog front end for receiving video graphics array (VGA) signals, an on-screen display (OSD) chip, a read only memory (ROM) chip, and a low voltage differential signal (LVDS) transmitter for driving the display panel. The power supply module also requires heavy metallic electromagnetic interference (EMI) shielding that extend over the entire back surface of the display chassis and typically attaches to a heavy metal frame for structural rigidity. Cable connections are provided on a side of the display chassis in order to connect the display to an IHS. These and other display components work to limit the ability to produce a display that is thinner than conventional displays.

Accordingly, it would be desirable to provide a display architecture that overcomes the disadvantages discussed above in order to allow displays to be produced that are thinner than conventional displays.

SUMMARY

According to one embodiment, a display system includes a display chassis defining a display chassis housing, a display panel located in the display chassis housing, a power supply module chassis defining a power supply module housing and coupled to the display chassis outside of the display chassis housing, and a power supply module located in the power supply module housing and coupled to the display panel.

BRIEF DESCRIPTION OF THE DRAWINGS

FIG. 2b is a rear perspective view illustrating an embodiment of the display of FIG. 2a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
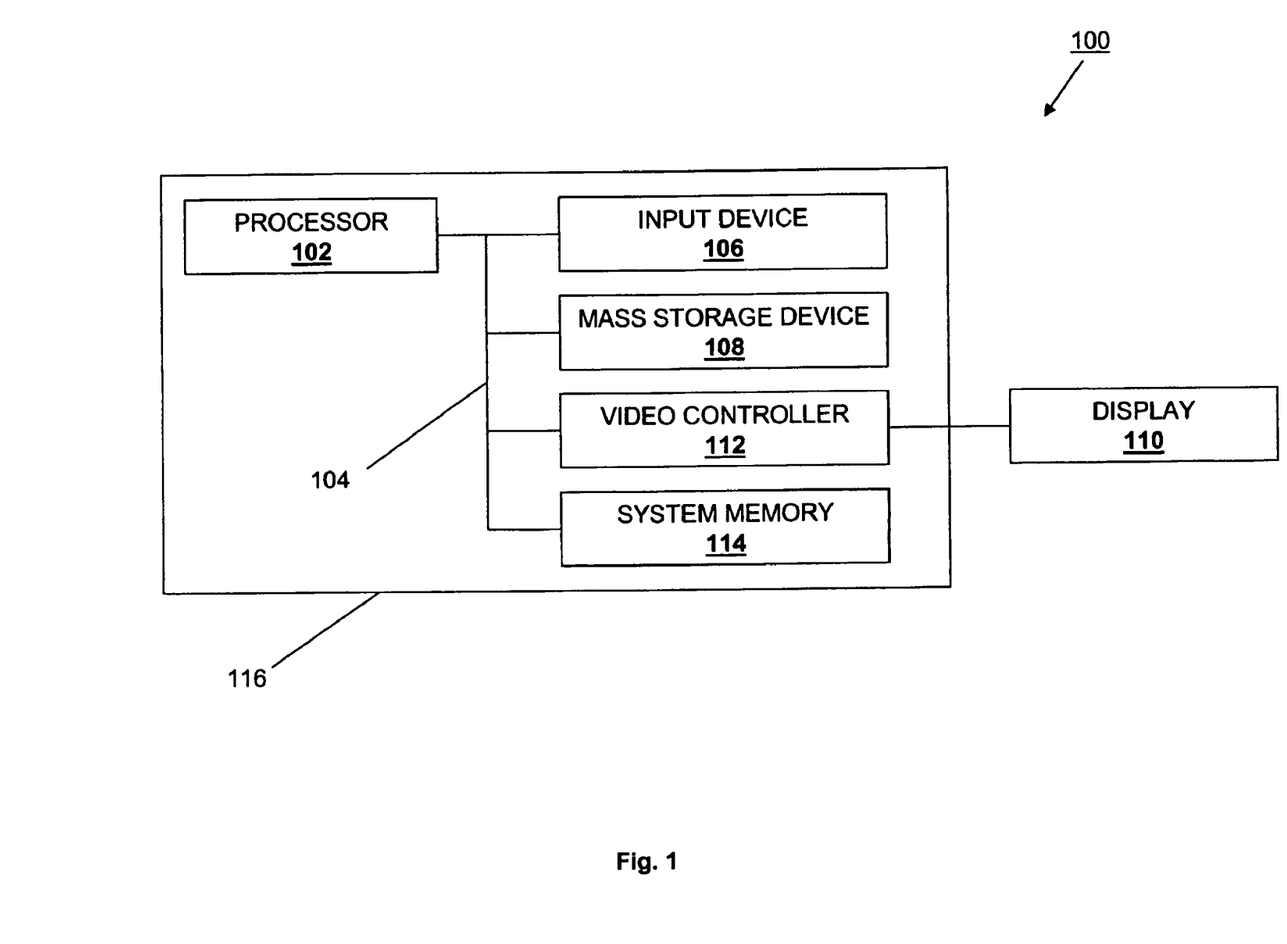
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
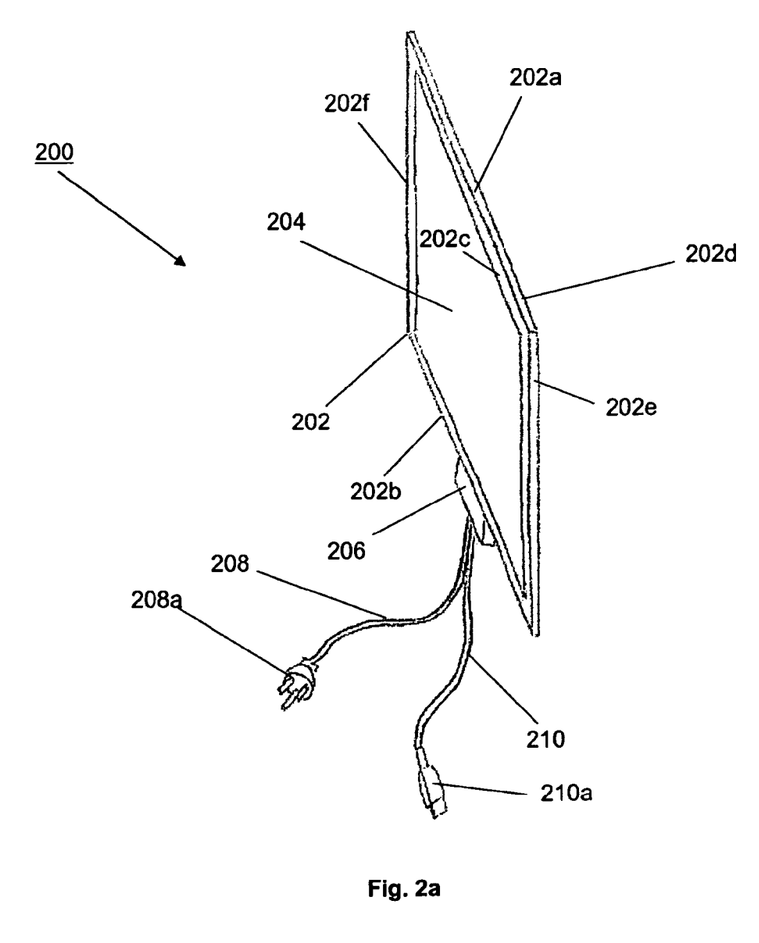
FIG. 2a is a front perspective view illustrating an embodiment of a display.
Figure 2B:
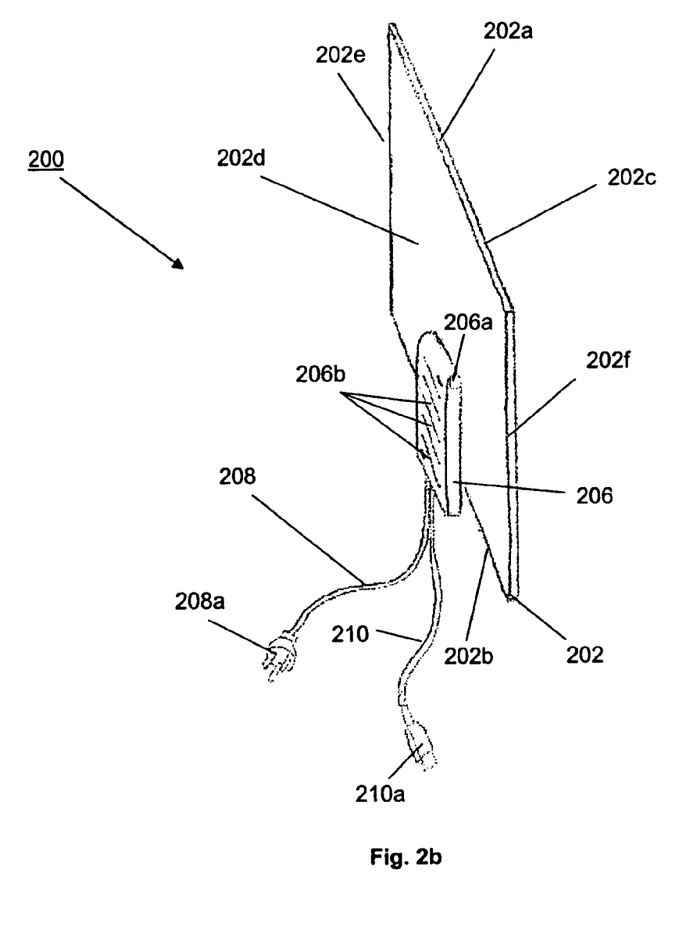
Figure 2C:
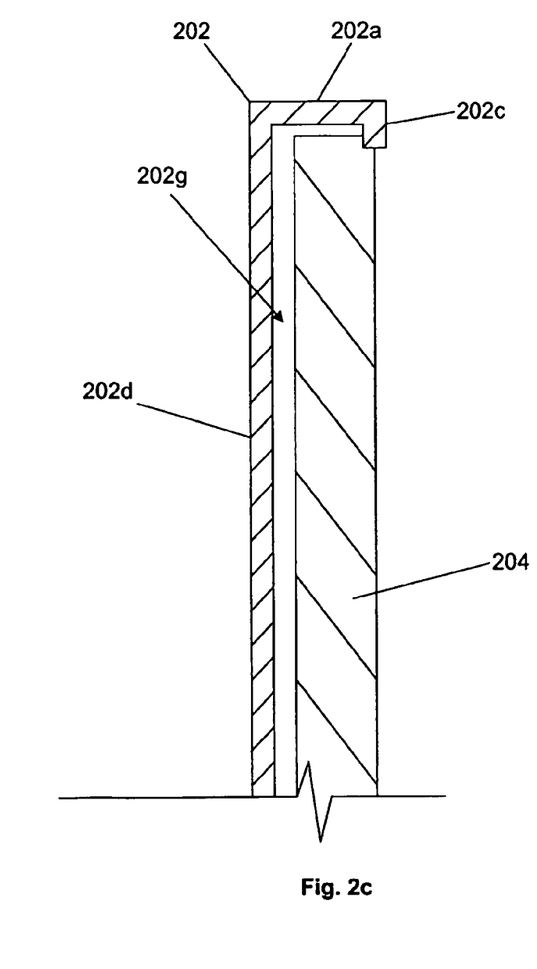
FIG. 2c is a cross sectional view illustrating an embodiment of the display of FIGS. 2a and 2b.

Referring now to FIGS. 2a, 2b and 2c, a display 200 is illustrated. The display 200 includes a display chassis 202 having a top edge 202a, a bottom edge 202b located opposite the top edge 202a, a front surface 202c extending between the top edge 202a and the bottom edge 202b, a rear surface 202d located opposite the front surface 202c and extending between the top edge 202a and the bottom edge 202b, and a pair of opposing side edges 202e and 202f extending between the top edge 202a, the bottom edge 202b, the front surface 202c, and the rear surface 202d. A display chassis housing 202g is defined by the display chassis 202 between the top edge 202a, the bottom edge 202b, the front surface 202c, the rear surface 202d, and the pair of side surfaces 202e and 202f. A display panel 204 is coupled to the display chassis 202 and located in the display chassis housing 202g. In an embodiment, the display panel 204 is a DisplayPort direct drive LCD panel that conforms to the DisplayPort digital display interface standard (http://en.wikipedia.orq/wiki/DisplayPort) put forth by the Video Electronics Standards Association (VESA). The DisplayPort digital display interface standard eliminates the need for conventional display electronics and user adjustments, and is compatible with high definition protected content. The DisplayPort digital display interface standard also enables delivery of audio to the display over a single cable and includes a bi-directional auxiliary channel for high bandwidth two way communications between the display and an IHS. A power supply module chassis 206 is coupled to the display chassis 202 through a coupling 206a that extends from the power supply module chassis 206 and is mounted to the rear surface 202d of the display chassis 202. In the illustrated embodiment, the coupling 206a is a hinge. However, one of skill in the art will recognize that the coupling between the display chassis 202 and the power supply module chassis 206 may be a non-moveable coupling or a number of alternative moveable couplings such as, for example, a ball and socket, a slidable coupling, and/or a variety of other moveable couplings known in the art. A plurality of cooling slots 206b are defined by the power supply module chassis 206 and extend through the power supply module chassis 206 from its outer surface (illustrated) to a power supply module housing (described and illustrated below) that is defined by the power supply module chassis 206. A power cable 208 extends from the power supply module chassis 206 and includes a power connector 208a on its distal end. In an embodiment, the power cable 208 includes a detachable connection (not illustrated) to the power supply module chassis 206. A data cable 210 extends from the power supply module chassis 206 and includes a data connector 210a on its distal end. In an embodiment, the data cable 210 is compatible with the DisplayPort display interface standard.

Figure 3:
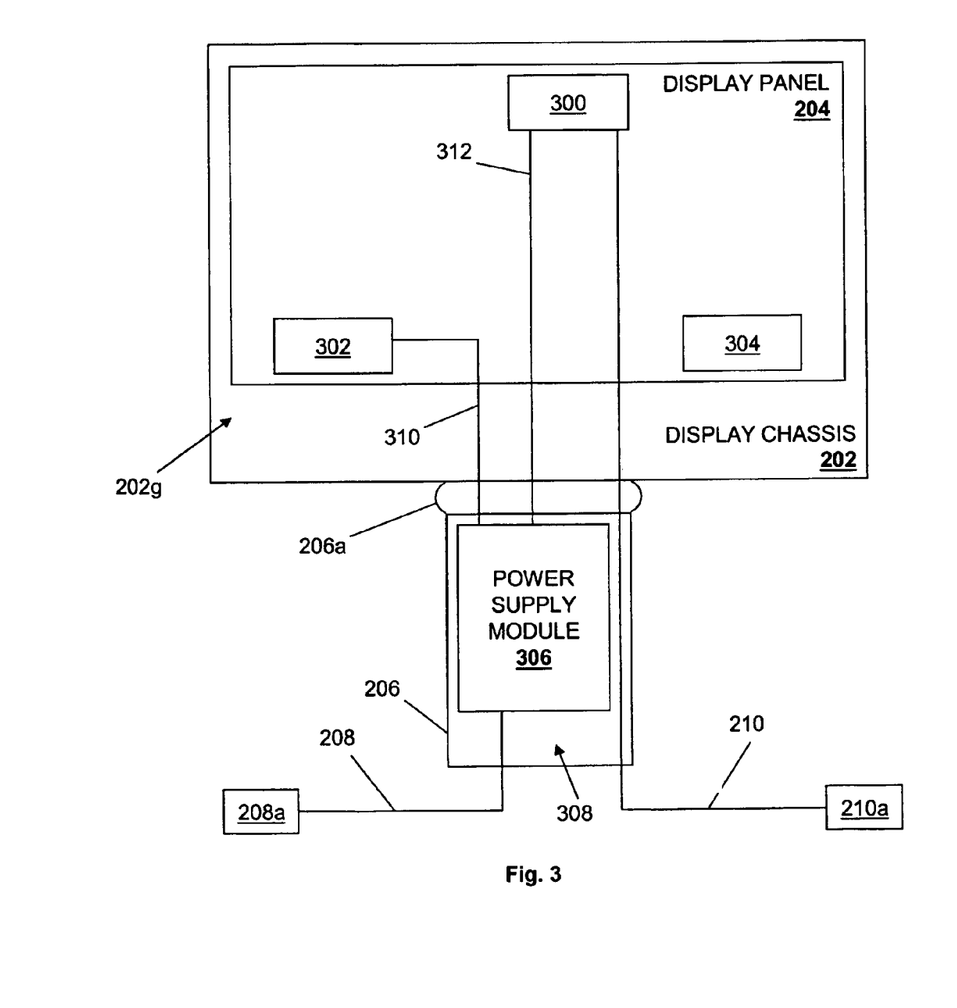
FIG. 3 is a schematic view illustrating an embodiment of the display of FIGS. 2a, 2b and 2c.

Referring now to FIGS. 2a, 2b and 3, one embodiment of the display 200 is illustrated. The display panel 204 is located in the display chassis housing 202g of the display chassis 202 and includes a timing controller 300 and a plurality of inverters 302 and 304. In an embodiment, the display panel 204 may be a liquid crystal display (LCD) panel. In an embodiment, the timing controller 300 may be a direct drive monitor (DDM) timing controller. In an embodiment, the inverters 302 and 304 may be inverters for cold cathode fluorescent lighting (CCFL) backlights for the display panel 204. A power supply module 306 is located in a power supply module housing 308 defined by the power supply module chassis 206. In an embodiment, EMI shielding is provided in the power supply module housing 308 in order to shield EMI produced by the power supply module 306. The inverter 302 is coupled to the power supply module 306 by an inverter voltage supply cable 310 that extends from the inverter 302, through the display chassis housing 202g, out of the display chassis 202, through the coupling 206a, into the power supply module chassis 206, through the power supply module chassis housing 308, and to the power supply module 306. The timing controller 300 is coupled to the power supply module 306 by a panel voltage supply cable 312 that extends from the timing controller 300, through the display chassis housing 202g, out of the display chassis 202, through the coupling 206a, into the power supply module chassis 206, through the power supply module chassis housing 308, and to the power supply module 306. The data cable 210 extends from the timing controller 300, through the display chassis housing 202g, out of the display chassis 202, through the coupling 206a, into the power supply module chassis 206, through the power supply module chassis housing 308, and out of the power supply module chassis 206. The power cable 208 extends from the power supply module 306, through the power supply module chassis housing 308, and out of the power supply module chassis 308. In an embodiment, the power supply module 306 provides power to the timing controller 300 and the backlight assembly of the display panel 204. For example, the power supply module 306 may drive the inverters 302 and 304 which, in turn, may drive high output voltage to CCFL backlights on the display panel 204.

Figure 4:
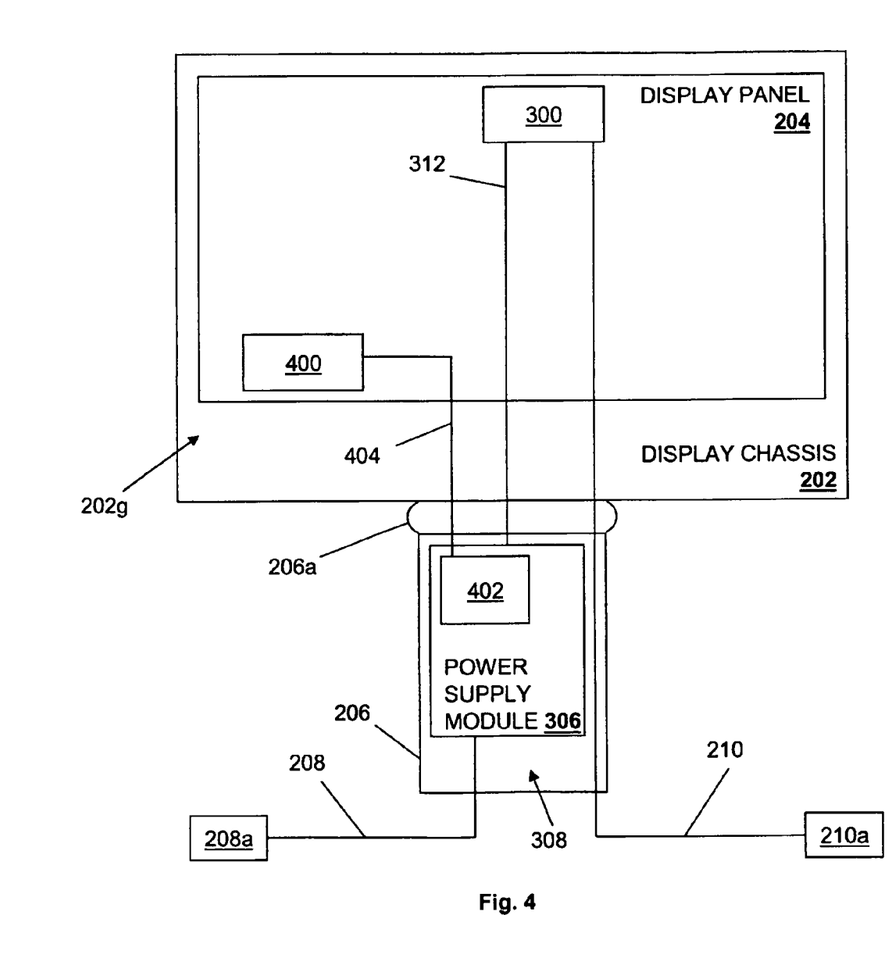
FIG. 4 is a schematic view illustrating an embodiment of the display of FIGS. 2a, 2b and 2c.

Referring now to FIGS. 2a, 2b and 4, another embodiment of the display 200 is illustrated. The display panel 204 is located in the display chassis housing 202g of the display chassis 202 and includes the timing controller 300 and a backlighting system 400. In an embodiment, the display panel 204 may be a liquid crystal display (LCD) panel. In an embodiment, the backlighting system 400 may be an light emitting device/diode (LED) backlighting system. A power supply module 306 is located in the power supply module housing 308 defined by the power supply module chassis 206. In an embodiment, EMI shielding is provided in the power supply module housing 308 in order to shield EMI produced by the power supply module 306. A power inverter 402 is located in the power supply module housing 308 defined by the power supply module chassis 206 and may be coupled to the power supply module 306. The backlighting system 400 is coupled to the power supply module 306 and/or the power inverter 402 by a voltage supply cable 404 that extends from the backlighting system 400, through the display chassis housing 202g, out of the display chassis 202, through the coupling 206a, into the power supply module chassis 206, through the power supply module chassis housing 308, and to the power supply module 306 and/or the power inverter 402. The timing controller 300 is coupled to the power supply module 306 by the panel voltage supply cable 312 that extends from the timing controller 300, through the display chassis housing 202g, out of the display chassis 202, through the coupling 206a, into the power supply module chassis 206, through the power supply module chassis housing 308, and to the power supply module 306. The data cable 210 extends from the timing controller 300, through the display chassis housing 202g, out of the display chassis 202, through the coupling 206a, into the power supply module chassis 206, through the power supply module chassis housing 308, and out of the power supply module chassis 308. The power cable 208 extends from the power supply module 306, through the power supply module chassis housing 308, and out of the power supply module chassis 308. In an embodiment, the power supply module 306 provides power to the timing controller 300 and includes the power inverter 402 to drive an LED backlighting system 400 in the display panel 204.

Figure 5:
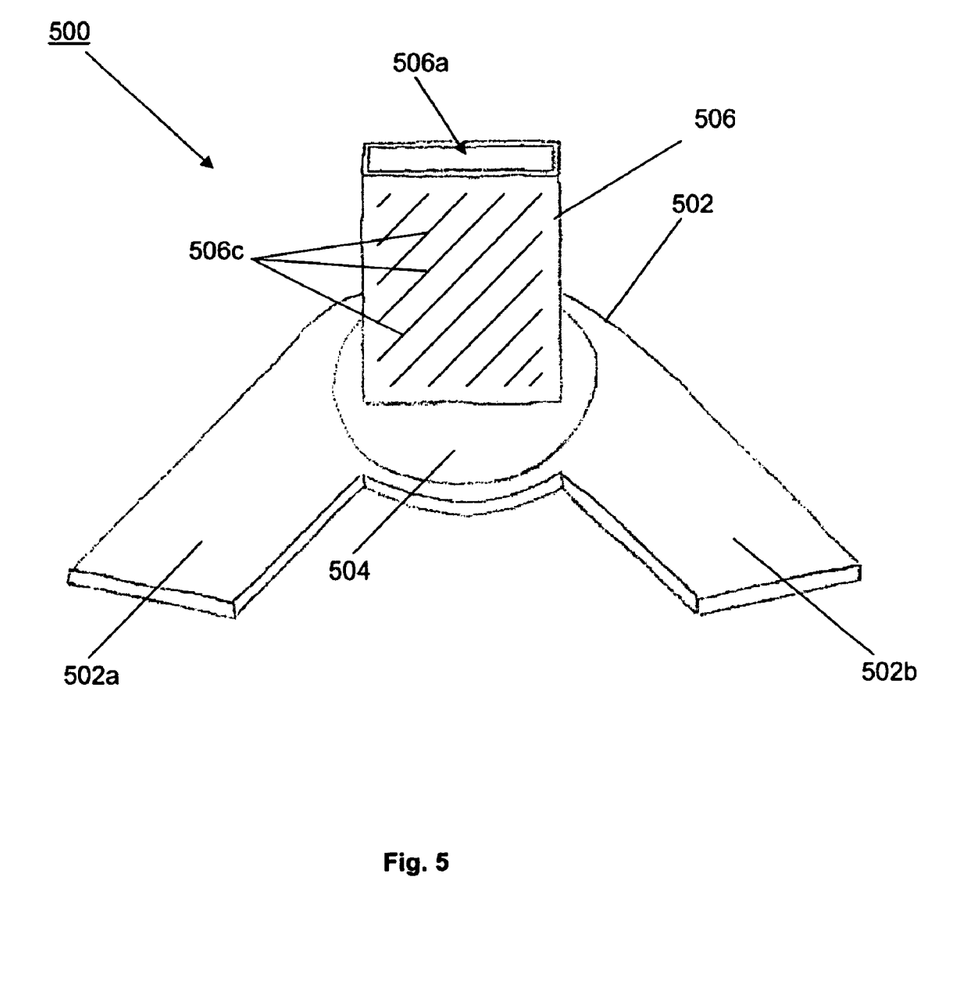
FIG. 5 is a perspective view illustrating an embodiment of a display support member used with the displays of FIGS. 2a, 2b, 2c, 3 and 4.
Figure 6:
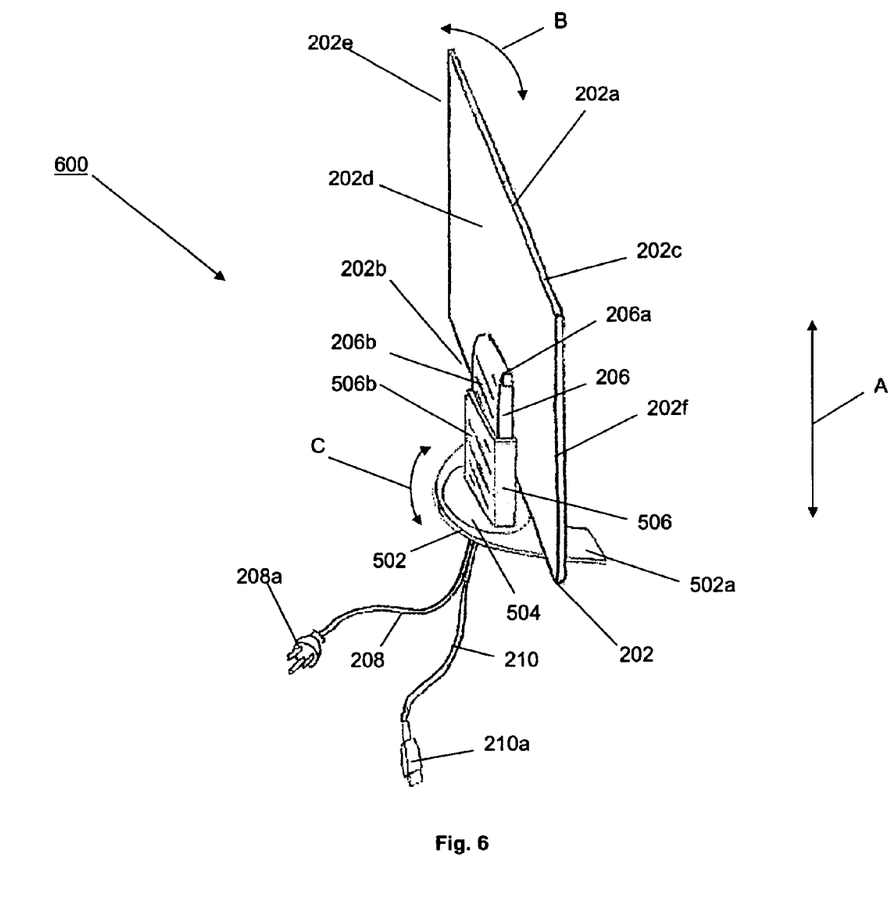
FIG. 6 is a perspective view illustrating an embodiment of the display of FIGS. 2a, 2b, 2c, 3 and 4 coupled to the display support member of FIG. 5.

Referring now to FIG. 5, a display support member 500 is illustrated. The display support member 500 includes a base 502 having a plurality of legs 502a and 502b that extend from the base 502. A rotatable coupling 504 is moveably coupled to the base 502. A display coupling member 506 extends from the rotatable coupling 504a and defines a display coupling member housing 506a. The display coupling member 506 also defines a plurality of cooling slots 506c that extend through the display coupling member 506 to the display coupling member housing 506a.

Referring now to FIGS. 2a, 2b, 2c, 5 and 6, a display system 600 is illustrated. In the illustrated embodiment, the display system 600 includes the display 200 and the display support system 500. The display 200 is positioned adjacent the display support member 500 such that a distal end of the power supply module chassis 206 is located adjacent the display coupling member housing 506a defined by the display coupling member 506. The power supply module chassis 206 is then moved into the display coupling member housing 506a to couple the display 200 to the display support member 500. In an embodiment, the display coupling member 506 includes features located, for example, within the display coupling member housing 506a, that engage the power supply module chassis 206 such that the power supply module chassis 206 may be moved in the display coupling member housing 506a and held in place in different positions, allowing the display 200 to be moved along a direction designated A relative to the display support member 500. Further movement of the display 200 relative to the display support member 500 may be accomplished by, for example, swiveling the display 200 relative to the power supply module chassis 206 on the coupling 206a along an arc designated B and/or rotating the display 200 relative to the base 502 of the display support member 500 on the rotatable coupling 504 along an arc designated C. In an embodiment, the base 502 may include apertures through which the power cord 208 and data cord 210 may extend through. In another embodiment, the base 502 may include connectors that connect to the power cord 208 and the data cord 210 and that further allow separate detachable power cords and/or data cords, which include the power connector 208a and the data connector 210a, to detachably couple to the base 502. In yet another embodiment, the display support member 500 may be integral to and not detachable from the display chassis 202. In an embodiment, the power connector 208a may be couple to a power source, and the data connector 210a may be coupled to an IHS processor in order to couple the display panel 204 to the IHS processor.

Figure 7:
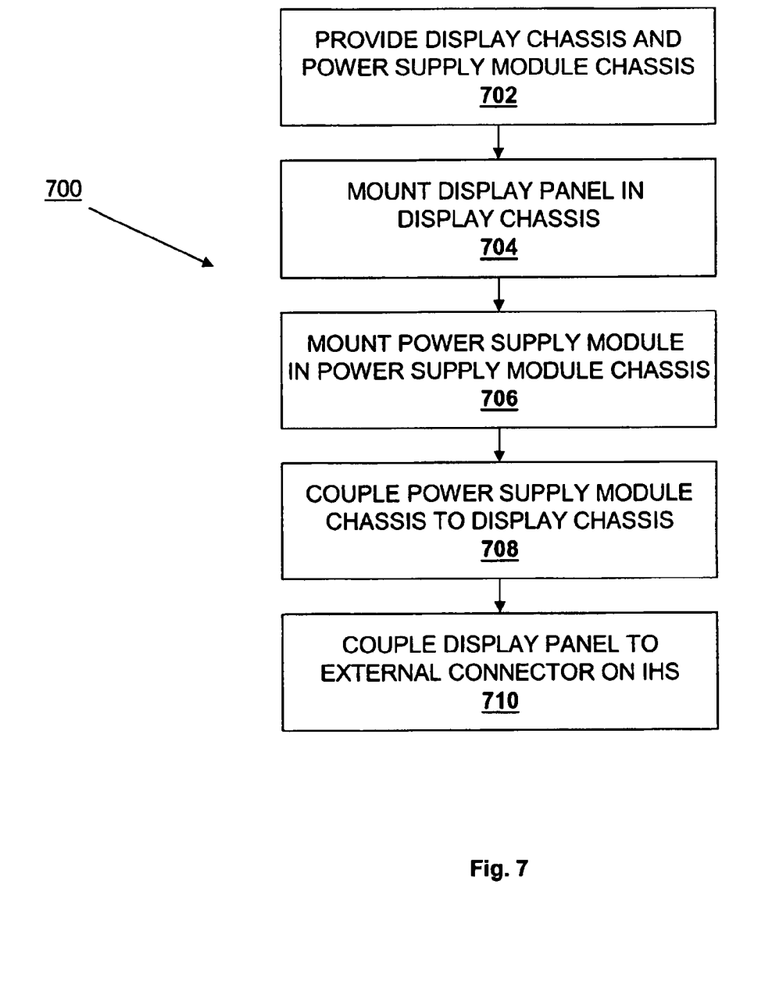
FIG. 7 is a flow chart illustrating an embodiment of a method for providing a thin display.

Referring now to FIG. 7, a method 700 for providing a thin display is illustrated. The method 700 begins at block 702 where the display chassis 202 and the power supply module chassis 206 are provided. The method 700 then proceeds to block 704 where the display panel 204 is mounted in display chassis housing 202g defined by the display chassis 202. The method 700 then proceeds to block 706 where the power supply module 306/406 is mounted in the power supply module chassis housing 308 defined by the power supply module chassis 206. The method 700 then proceeds to block 708 where the power supply module chassis 206 is coupled to the display chassis 202. In the embodiment illustrated in FIGS. 2a and 2b, the coupling 206a between the power supply module chassis 206 and the display chassis 202 comprises a hinge that allows the display chassis 202 to move relative to the power supply module chassis 206. However, the coupling of the power supply module chassis 206 and the display chassis 202 may not be a moveable coupling. Furthermore, one of skill in the art will recognize a variety of moveable couplings that may be used in place of the hinge such as, for example, a ball and socket coupling, a slidable coupling, and/or a variety other moveable couplings known in the art. The method 700 then proceeds to block 710 where the display panel 204 is coupled to an external connector on an IHS. The data connector 210a that is coupled to the display panel 204 may be coupled to a connector that is externally accessible on an IHS such as, for example, the IHS 100 described above with reference to FIG. 1. Allowing the display panel 204 to connect to an external connector on the IHS allows the display 200 to be interoperable with any IHS having a connector that is compatible with the data connector 210a such as, for example a connector that is compatible with the DisplayPort digital display interface standard.

Figure 8:
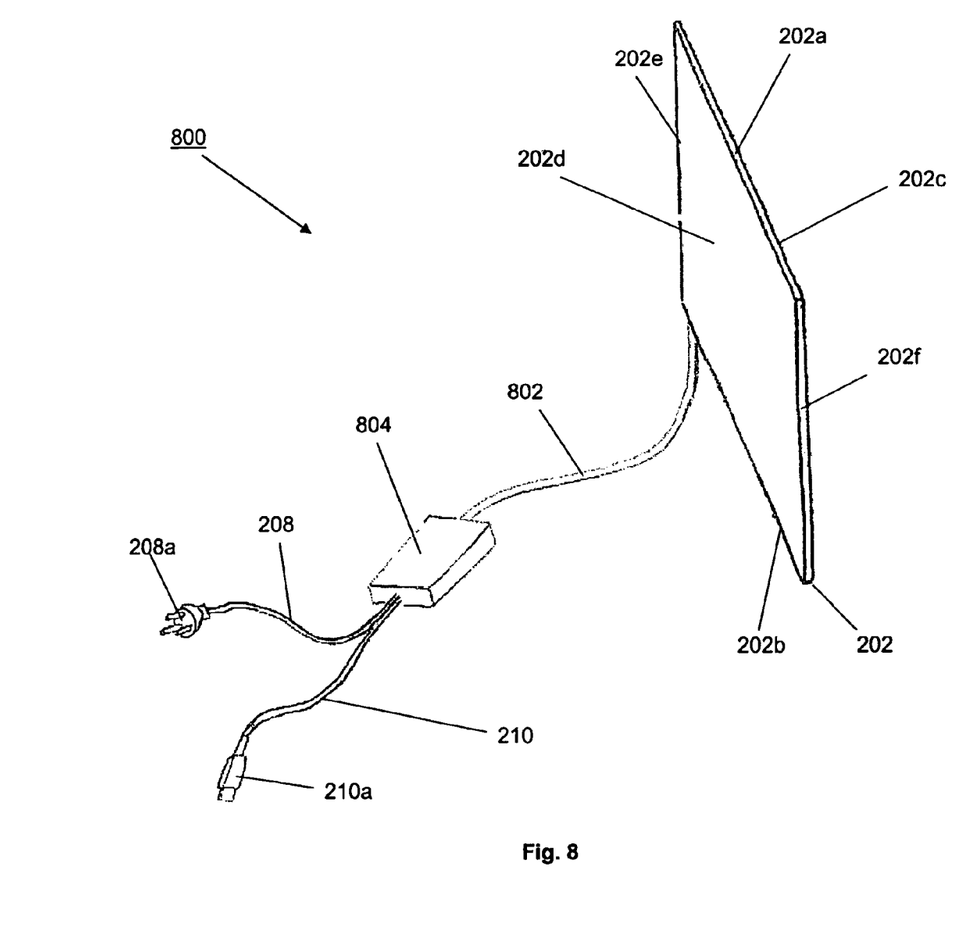
FIG. 8 is a perspective view illustrating an embodiment of a display.

Referring now to FIG. 8, an embodiment of a display 800 is illustrated that is substantially similar in structure and operation to the display 200, described above with reference to FIGS. 2a, 2b and 2c, with the provision of a cable 802 and power supply module chassis 804 replacing the power supply module chassis 206 and the coupling 206a. The cable 802 extends from a coupling with the display panel 204 and through the bottom surface 202b of the display chassis 202 to the power supply module chassis 804. In an embodiment, the power supply module chassis 804 may include similar components to the power supply module chassis 206 illustrated in FIGS. 3 and 4. The power cable 208 and the data cable 210 extend from the power supply module chassis 804.

Thus, a novel display system architecture has been described that provides an externally connectable display that is thinner than conventional externally connectable displays by repositioning the location of display components to, for example, display support members, in order to provide a display system that consumes substantially less space than conventional display systems. In an experimental embodiment, the architecture described provided a display chassis 202 having a thickness, measured from the front surface 202c to the rear surface 202d, of 12 mm using a standard 9 mm display panel 204, and taking up 3 inches desk space as compared to 8 inches required by conventional displays. Furthermore, the architecture allows the removal of support frames and unneeded EMI shielding that is required by conventional displays, resulting in a lighter weight display than is possible with conventional display, which reduces shipping costs.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A display system, comprising:
 a display chassis including a front outer surface and a rear outer surface located opposite the front outer surface, wherein the display chassis defines a display chassis housing between the front outer surface and the rear outer surface;

a display panel located in the display chassis housing and including a display panel surface located adjacent the front outer surface;

a power supply module chassis defining a power supply module housing and moveably coupled to the display chassis through a hinge that extends from the rear outer surface on the display chassis such that the display chassis is moveable relative to the power supply module chassis and the power supply module chassis is located outside of the display chassis housing;

a power supply module located in the power supply module housing and coupled to the display panel; and a display support member including a base having a plurality of legs and a display coupling member that extends from the base and defines a display coupling member housing, wherein the power supply module chassis is positioned in the display coupling member housing such that the power supply module chassis is telescopically moveable relative to the display coupling member.

2. The system of claim 1, further comprising:
an inverter located in the display chassis housing and coupled to the display panel.

3. The system of claim 1, further comprising:
an inverter located in the power supply module housing and coupled to the display panel.

4. The system of claim 1, further comprising:
an electromagnetic interference (EMI) shielding member coupled to the power supply module chassis.

5. The system of claim 1, further comprising:
a data connector extending from the display panel and operable to be externally and removeably connected to an information handling system.

6. The system of claim 1, further comprising:
at least one cooling slot defined by each of the power supply module chassis and the display coupling member.

7. The system of claim 1, wherein the power supply module chassis is operable to be held in position relative to the display coupling member along a range of the telescopic motion.

8. The system of claim 1, wherein the power supply module chassis is integral with the display support member.

9. The system of claim 1, wherein the power supply module chassis is removeably coupled to the display support member.

10. An information handling system (IHS), comprising:
an IHS chassis;
a processor mounted in the IHS chassis;
a display chassis that is separate from the IHS chassis and that includes a front outer surface and a rear outer surface that is opposite the front outer surface, wherein the display chassis defines a display chassis housing between the front outer surface and the rear outer surface that houses a display panel having a display panel surface located adjacent the front outer surface, and wherein the display panel is coupled to the processor;
a power supply module chassis defining a power supply module housing and moveably coupled to the display chassis through a hinge that extends from the rear outer surface on the display chassis such that the display chassis is moveable relative to the power supply module chassis and the power supply module chassis is located outside of the display chassis housing;
a power supply module located in the power supply module housing and coupled to the display panel; and
a display support member including a base having a plurality of legs and a display coupling member that extends from the base and defines a display coupling member housing, wherein the power supply module chassis is positioned in the display coupling member housing such that the power supply module chassis is telescopically moveable relative to the display coupling member.

11. The system of claim 10, further comprising:
an inverter located in the display chassis housing and coupled to the display panel.

12. The system of claim 10, further comprising:
an inverter located in the power supply module housing and coupled to the display panel.

13. The system of claim 10, further comprising:
an electromagnetic interference (EMI) shielding member coupled to the power supply module chassis.

14. The system of claim 10, further comprising:
a data connector that extends from the display panel and that is externally and removeably connected to the IHS.

15. The system of claim 10, further comprising:
at least one cooling slot defined by each of the power supply module chassis and the display coupling member.

16. The system of claim 10, wherein power supply module chassis is operable to be held in position relative to the display coupling member along a range of the telescopic motion.

17. The system of claim 10, wherein the power supply module chassis is integral with the display support member.

18. The system of claim 10, wherein the power supply module chassis is removeably coupled to the display support member.

19. A method for providing a thin display, comprising:
providing a display chassis including a front outer surface and a rear outer surface located opposite the front outer surface, wherein the display chassis defines a display chassis housing between the front outer surface and the rear outer surface;
providing a power supply module chassis defining a power supply module housing;
mounting a display panel in the display chassis housing;
mounting a power supply module in the power supply module housing;
moveably coupling the power supply module chassis to the display chassis through a hinge that extends from the rear outer surface on the display chassis such that the display chassis is moveable relative to the power supply module chassis and the power supply module chassis is located outside of the display chassis housing; and
positioning the power supply module chassis in a display coupling member housing defined by a display coupling member that extends from a base on a display support member, wherein the display support member includes a plurality of legs that extend from the base, and wherein the power supply module chassis is telescopically moveable relative to the display coupling member.

20. The method of claim 19, further comprising:
coupling the display panel to an external data connector on an information handling system.

* * * * *